Aug. 7, 1956     S. TATAR     2,757,646
CRANKSHAFT MOUNTING
Filed July 25, 1952     2 Sheets-Sheet 1

INVENTOR.
STANLEY TATAR

Aug. 7, 1956 S. TATAR 2,757,646
CRANKSHAFT MOUNTING
Filed July 25, 1952 2 Sheets-Sheet 2
FIG. 2.
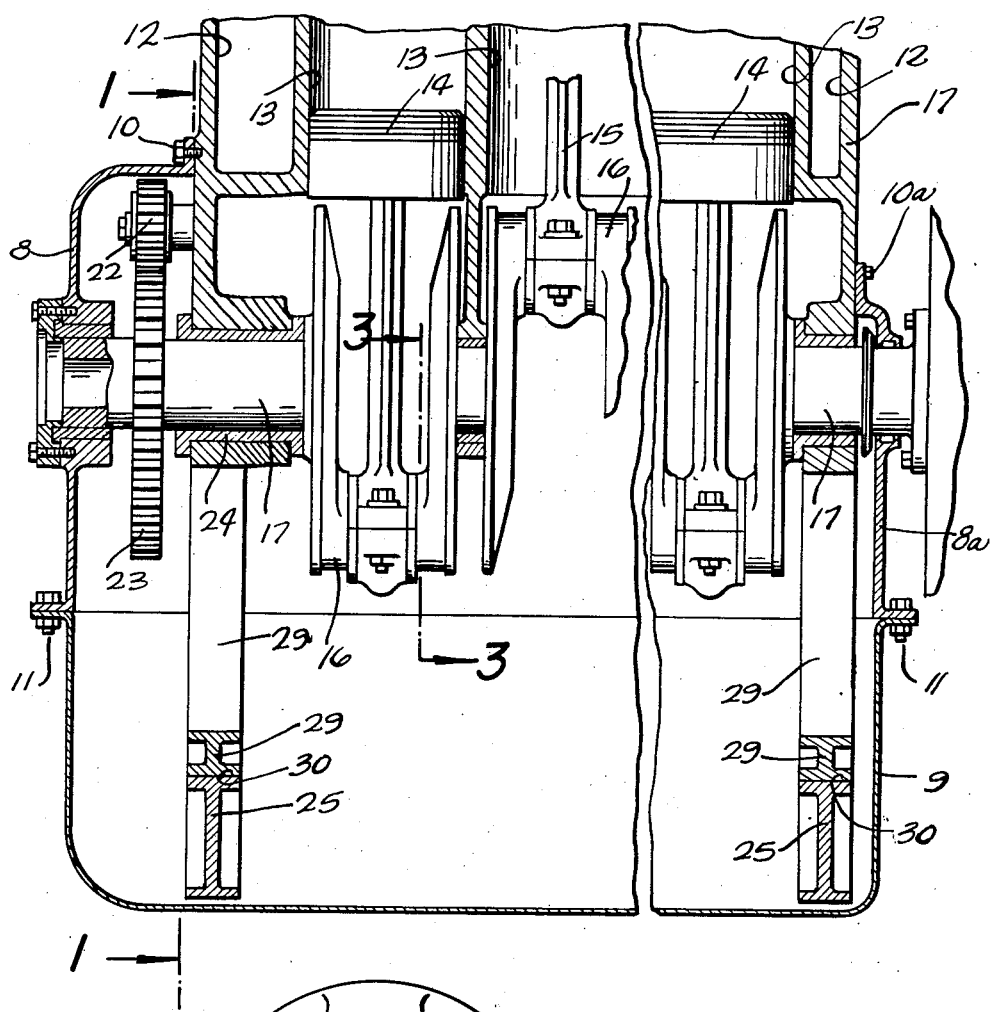
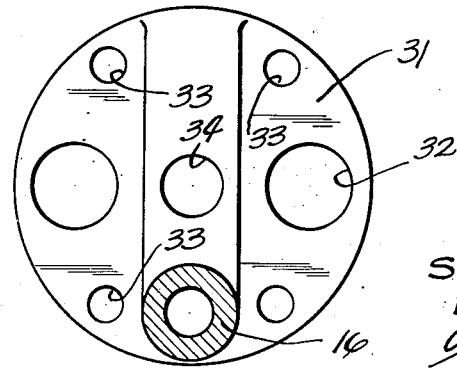
FIG. 3.
INVENTOR.
STANLEY TATAR
BY
ATTORNEY.

United States Patent Office 2,757,646
Patented Aug. 7, 1956

2,757,646
CRANKSHAFT MOUNTING
Stanley Tatar, Detroit, Mich.

Application July 25, 1952, Serial No. 300,815

3 Claims. (Cl. 121—194)

My invention relates to a new and useful improvement in a crankshaft mounting adapted particularly for mounting crankshafts which are propelled through reciprocating pistons and which are primarily used on internal combustion engines.

In the use of such engines should the bearings of the crankshaft become worn or move out of alignment the efficiency of the engine operation will be considerably reduced and a strain will be placed on the parts connected to the crankshaft, resulting in excessive wear on various parts of the engine. A common cause for the bearings moving out of alignment is the shaking loose or wearing loose of the supporting parts, which serve to support the crankshaft.

It is an object of the present invention to provide a crankshaft mounting whereby the strain on the bearings of the crankshaft itself will be considerably reduced and whereby the radial thrust of the crankshaft will be resisted by an integral part of the engine block.

Another object of the invention is the provision in a crankshaft mounting of a structure whereby a larger bearing surface may be provided for supporting the crankshaft.

Other objects will appear hereinafter.

It is recognized that various modifications and changes may be made in the detail of structure illustrated without departing from the invention and it is intended that the present disclosure shall be considered to be but the preferred embodiment.

Forming a part of this application are drawings in which:

Fig. 2 is a fragmentary sectional view taken on line 2—2 of Fig. 1 with parts broken away.

Fig. 3 is a sectional view taken on line 3—3 of Fig. 2.

Figure 1:
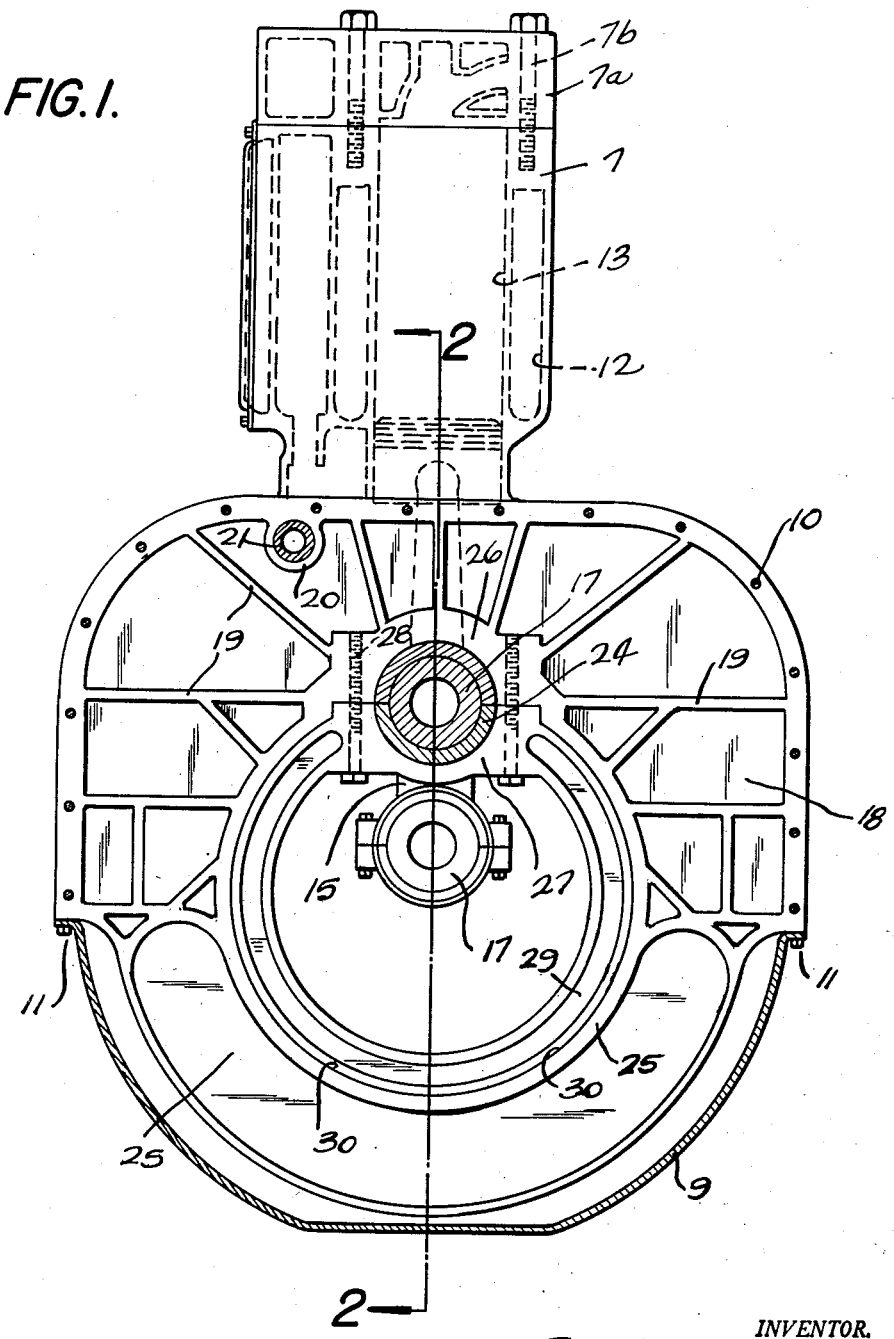
Fig. 1 is a view taken on line 1—1 of Fig. 2.

In the drawings I have illustrated the invention used on an engine having an engine block 7. In the block 7 is formed a water chamber 12 and cylinders 13 are also formed in this block. Slidable in each of these cylinders 13 is a piston 14 connected by a connecting rod 15 to a crank 16 of a crankshaft 17.

Secured to one end of the engine block 7 by means of bolts 10 is a cover 8. A cover 8a is secured to the opposite end by means of bolts 10a and connected by bolts 11 to the lower edge of these covers is an oil pan 9.

Formed integral with the block 7 at opposite sides thereof is a depending end wall 18, which serves to form an end wall for the crank case. On the outer face of this member 18 are reenforcing ribs 19 and extending through them is a cam shaft 21 supported on bearings 20. Mounted on the cam shaft is a cam gear 22 driven by the pinion 23, which is fixedly mounted on the crankshaft 17. This crankshaft is journaled at its opposite ends in bushings 24. The bushing is supported in a bearing embodying the bearing blocks 26 and 27 which are secured together by the bolts 28. An annular supporting portion 25 is formed on the member 18. An annular portion 29 is carried by the bearing block 27 and seats upon the inner face 30 of the annulus 25. Thus the bearing embodying the blocks 26 and 27 is relieved of considerable strain as the members 29 and 25 serve as cooperating supporting bodies for supporting the crankshaft. By forming these members of the size indicated in Fig. 1 it is obvious that a larger bearing and supporting surface is present than were the bearing blocks alone required to carry the weight.

This structure also affords a mounting whereby the crank shaft may be easily mounted in position and easily and quickly removed. All that is necessary, after the crankshaft has been mounted, is to remove the bolts 28, whereupon the block 27 and the member 29 may be moved axially off of the shaft. The reverse operation takes place when mounting the shaft in position. The shaft is first placed in the position shown in Fig. 1 and while so held in position the parts 27 and 29 are moved axially into their position and then secured by the bolts 28.

In the construction of the crankshaft I depart from conventional design. The legs of the crankshaft each comprise a circular disc 31, in which are formed the openings 32, 33 and 34 for the purposes of reducing the weight. By having the legs of the crank formed in this manner a smoother operation is obtained. The disc itself serves undoubtedly to counteract some of the unbalanced forces of the rotating shaft.

Experience has shown that a crankshaft mounting of this type is highly efficient in use, durable and prevents the damaging effects of an unstable crankshaft mounting.

What I claim is:

1. In an internal combustion engine, a cylinder block; a front end wall and a rear end wall in said engine block and projecting downwardly therefrom; a crankshaft rotatably mounted in said cylinder block; the front and rear end journals of said crankshaft being solely supported by a bearing means in each of said front and rear end walls respectively; said bearing means in each of said end walls including a substantially circular opening formed therein to provide a circular bearing surface; an upper bearing block integral with the end wall and being disposed above said circular opening; a recess in the end wall below said upper bearing block and communicating with said circular opening; a lower bearing block engageable with the lower face of said upper bearing block to provide therewith a bearing adapted to support one entire crankshaft end journal, said lower bearing block having shoulders thereon which seat in said recess; an integral annulus on said lower bearing block engageable in said circular opening and bearing at its periphery against said circular bearing surface for supporting said lower bearing block in engagement with said upper bearing block, and means for detachably securing said bearing blocks together.

2. In an internal combustion engine, a cylinder block; a front end wall and a rear end wall in said engine block and projecting downwardly therefrom; a crankshaft rotatably mounted in said cylinder block; the front and rear end journals of said crankshaft being solely supported by a bearing means in each of said front and rear end walls respectively; said bearing means in each of said end walls including a substantially circular opening formed therein to provide a circular bearing surface; an upper bearing block integral with the end wall and being disposed above said circular opening; a recess in the end wall below said upper bearing block and communicating with said circular opening; a lower bearing block engageable with the lower face of said upper bearing block, said bearing blocks being extended inwardly from the end wall and coacting to provide a bearing of a length sufficient to support one entire crankshaft end journal; said lower bearing block having shoulders thereon which seat in said recess; an integral annulus on said lower bearing block engageable in said circular opening and bearing at its periphery against said circular bearing surface for supporting said lower bearing block in engagement with said upper bearing block; and means for detachably securing said bearing blocks together.

3. The invention as set forth in claim 2 wherein: the bearing blocks in the front end wall extend inwardly from said front end wall a distance greater than the longitudinal length of the annulus; and the bearing blocks in the rear end wall extend inwardly from said rear end wall a distance equal to the longitudinal length of the annulus.

References Cited in the file of this patent

UNITED STATES PATENTS

| | | |
|---|---|---|
| 1,868,937 | Bugatti | July 26, 1932 |
| 2,680,428 | Tatar | June 8, 1954 |

FOREIGN PATENTS

| | | |
|---|---|---|
| 58,096 | Denmark | Oct. 21, 1940 |
| 173,502 | Switzerland | Feb. 16, 1935 |
| 349,407 | Great Britain | May 28, 1931 |
| 350,351 | Great Britain | June 11, 1931 |
| 591,521 | Great Britain | Aug. 20, 1947 |